United States Patent
Li et al.

(10) Patent No.: US 10,302,797 B2
(45) Date of Patent: May 28, 2019

(54) SYSTEM AND METHOD TO IMPROVE ACCURACY OF GALVANIC TOOL MEASUREMENTS

(75) Inventors: Shanjun Li, Katy, TX (US); Luis E. San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 149 days.

(21) Appl. No.: 14/409,890

(22) PCT Filed: Jul. 12, 2012

(86) PCT No.: PCT/US2012/046346
§ 371 (c)(1),
(2), (4) Date: Dec. 19, 2014

(87) PCT Pub. No.: WO2014/011170
PCT Pub. Date: Jan. 16, 2014

(65) Prior Publication Data
US 2015/0185353 A1    Jul. 2, 2015

(51) Int. Cl.
*G01V 3/20* (2006.01)
*E21B 47/10* (2012.01)
*G01V 3/22* (2006.01)

(52) U.S. Cl.
CPC .............. *G01V 3/20* (2013.01); *E21B 47/102* (2013.01); *G01V 3/22* (2013.01)

(58) Field of Classification Search
CPC ... G01V 3/20; G01V 3/02; G01V 3/04; G01V 3/06; G01V 3/18; G01V 3/22; G01V 3/24;
(Continued)

(56) References Cited

U.S. PATENT DOCUMENTS 2,592,125 A * 4/1952 Doll .................. G01V 3/22
324/123 R
2,728,047 A 12/1955 Doll
(Continued)

FOREIGN PATENT DOCUMENTS

| EP | 0618463 A1 | 10/1994 |
| EP | 2148223 A1 | 1/2010 |
| GB | 2297165 A | 7/1996 |

OTHER PUBLICATIONS

International Preliminary Report on Patentability issued in related PCT Application No. PCT/US2012/046346 dated Sep. 5, 2014, 21 pages.
(Continued)

*Primary Examiner* — Lee E Rodak
(74) *Attorney, Agent, or Firm* — Benjamin Fite; Baker Botts L.L.P.

(57) ABSTRACT

A system and method for improving the accuracy of galvanic tool measurements is described. The system (300) may include a survey electrode ($A_0$) and a first monitor electrode ($M_1$·) positioned above the survey electrode. A second monitor electrode ($M_1$) may be positioned below the survey electrode, and a first conductive wire (307) may couple the first monitor electrode to the second monitor electrode. A first measurement point (302) may be located on the conductive wire, and a first resistive element ($R_{m1}$) may be coupled to the conductive wire.

14 Claims, 3 Drawing Sheets

(58) Field of Classification Search
CPC . G01V 3/265; G01V 3/28; G01V 3/38; E21B 47/102; E21B 47/024; E21B 47/09; E21B 47/00
USPC ....... 324/354, 355, 356, 357, 358, 359, 360, 324/361, 363, 364; 73/152.02, 152.43, 73/152.46
See application file for complete search history.

(56) References Cited

U.S. PATENT DOCUMENTS

| | | | |
|---|---|---|---|
| 2,813,249 A | | 11/1957 | Doll |
| 3,660,755 A | | 5/1972 | Janssen |
| 4,583,046 A | * | 4/1986 | Vinegar .................. G01V 3/24 324/373 |
| 4,796,186 A | * | 1/1989 | Kaufman ................ G01V 3/20 324/368 |
| 5,396,175 A | | 3/1995 | Seeman |
| 5,399,971 A | | 3/1995 | Seeman et al. |
| 5,563,514 A | * | 10/1996 | Moulin .................... G01V 3/20 324/368 |
| 5,585,727 A | * | 12/1996 | Fanini ..................... G01V 3/24 324/339 |
| 6,373,254 B1 | | 4/2002 | Dion et al. |
| 7,250,768 B2 | | 7/2007 | Ritter et al. |
| 7,256,582 B2 | | 8/2007 | Gorek et al. |
| 7,313,479 B2 | | 12/2007 | Frenkel |
| 7,576,543 B2 | | 8/2009 | Ritter et al. |
| 2007/0083330 A1 | | 4/2007 | Frenkel |

OTHER PUBLICATIONS

International Search Report and Written Opinion issued in related PCT Application No. PCT/US2012/046346 dated Apr. 3, 2013, 13 pages.

* cited by examiner

SYSTEM AND METHOD TO IMPROVE ACCURACY OF GALVANIC TOOL MEASUREMENTS

CROSS-REFERENCE TO RELATED APPLICATION

This application is a U.S. National Stage Application of International Application No. PCT/US2012/046346 filed Jul. 12, 2012, which is hereby incorporated by reference in its entirety.

The present disclosure relates generally to well drilling operations and, more particularly, to resistivity measurements during well drilling operations.

Existing well drilling operations require information on formation characteristics to aid in drilling decisions. Numerous measurement techniques are used, including logging while drilling (LWD), measuring while drilling (MWD), and wireline tests. One such measurement technique includes the use of a galvanic tool to take resistivity measurements of the surrounding formation. Variations in the formation resistivity may cause unwanted currents to flow within the galvanic tool, skewing the resistivity measurements and decreasing the accuracy of the galvanic tool.

FIGURES

Some specific exemplary embodiments of the disclosure may be understood by referring, in part, to the following description and the accompanying drawings.

Figure 1:
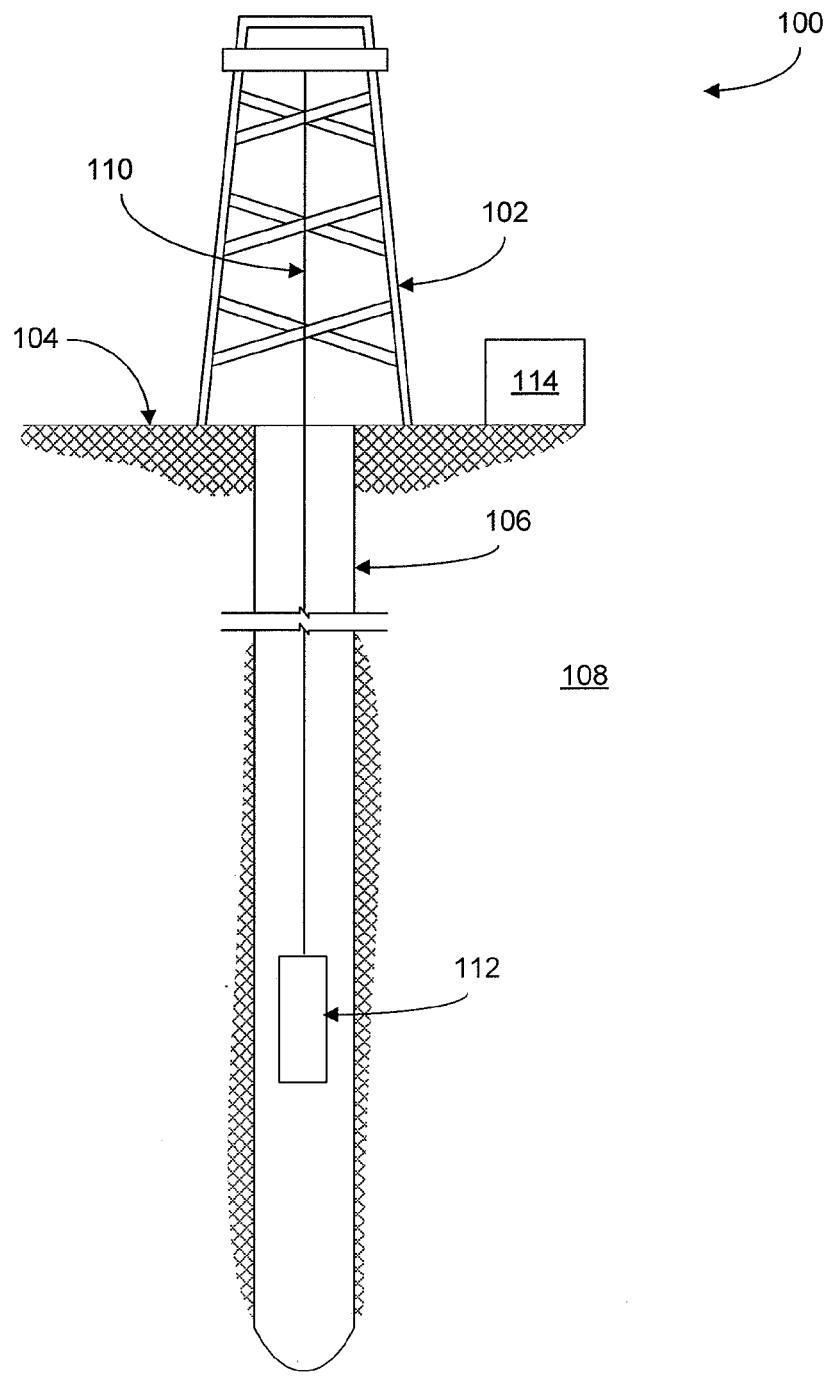
FIG. 1 illustrates an example drilling system, according to aspects the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to resistivity measurements during well drilling operations.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells as well as production wells, including natural resource production wells such as hydrogen sulfide, hydrocarbons or geothermal wells. Devices and methods in accordance with embodiments described herein may be used in one or more of wireline, slickline, MWD and LWD operations. Embodiments described below with respect to one implementation, such as wireline, are not intended to be limiting. Embodiments may be implemented in various formation tester tools suitable for testing, retrieval and sampling along sections of the formation that, for example, may be conveyed through flow passage in tubular string or using a wireline, slickline, tractor, piston, piston-tractor, coiled tubing, downhole robot or the like.

In this disclosure, a system and a method is proposed to improve the accuracy of a galvanic tool measurement. As will be discussed, the system may include a survey electrode, a first monitor electrode positioned above the survey electrode, and a second monitor electrode positioned below the survey electrode. A first conductive wire may couple the first monitor electrode to the second monitor electrode, and a measurement point may be located on the conductive wire. A first resistive element may be coupled to the conductive wire, and may balance the resistance between the measurement point and the first monitor electrode with the resistance between the measurement point and the second electrode. As will be discussed below, embodiments described in this disclosure may reduce the internal resistance effect of a galvanic measurement tool, thereby increasing the accuracy of resistivity measurements.

FIG. 1 shows an existing drilling system 100 that can be used for wireline logging operations. The drilling system 100 includes a rig 102 mounted at the surface 104, positioned above a borehole 106 within a subterranean formation 108. The rig 102 may be connected to a wireline 110, which may be coupled to and act as a communication medium for a galvanic tool 112. The galvanic tool may comprise, for example, an array laterolog. In certain embodiments, the wireline may be communicably coupled to a control system 114 at the surface, which may collect measurements gathered by the galvanic tool 112. The measurements may include, for example, resistivity measurements of the formation 108. The galvanic tool 112 may be positioned within the borehole 106. In certain embodiments, the galvanic tool 112 may be used in a wireline logging system, in which a drill string is pulled out of the borehole 106 so that wireline logging tools may be introduced within the borehole 106.

Figure 2:
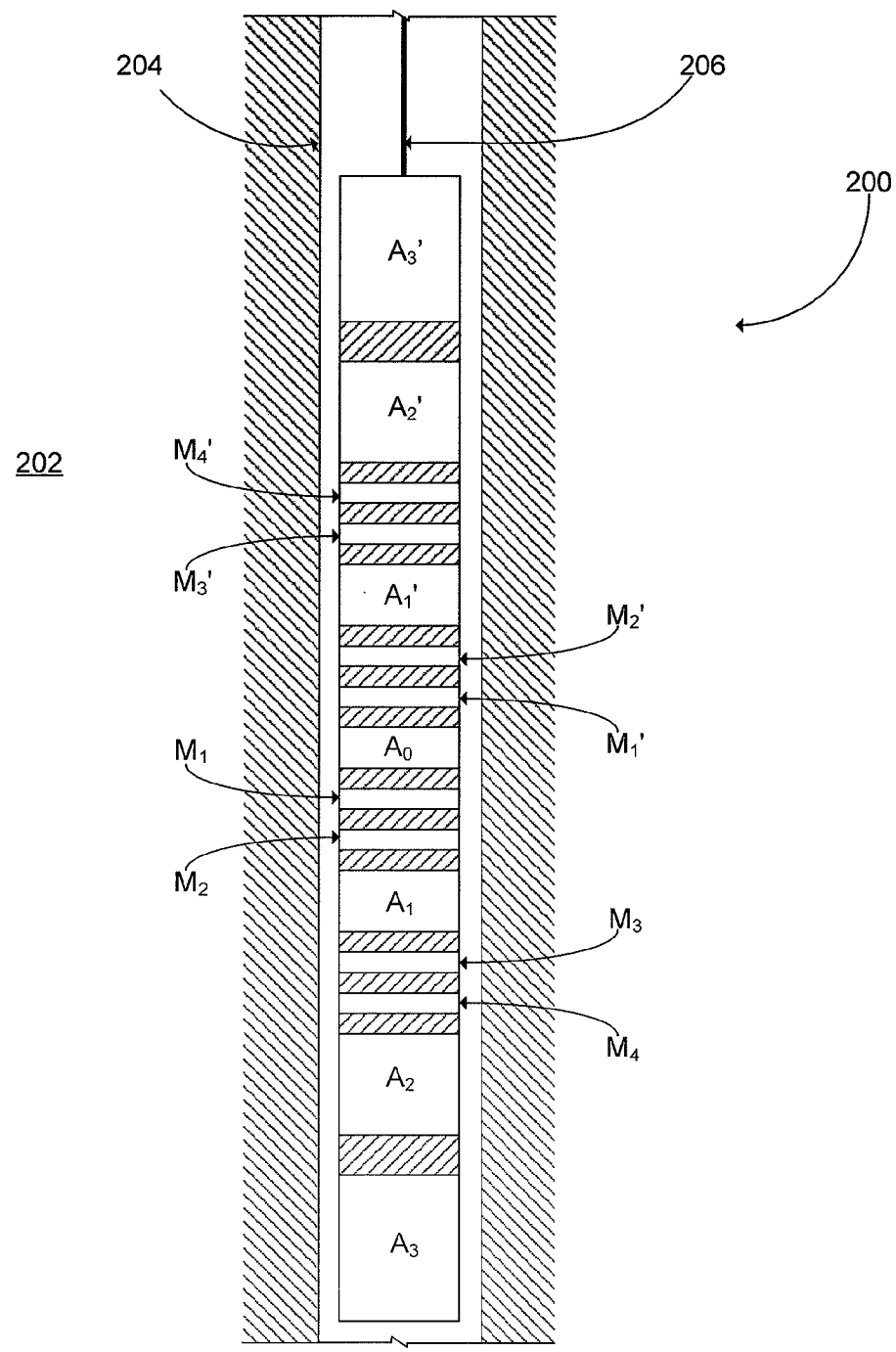
FIG. 2 illustrate a vertical cross-section of an example galvanic tool, according to aspects of the present disclosure.

The galvanic tool 112 may comprise a downhole sonde that includes a plurality of electrodes that transmit a current into the formation. FIG. 2 illustrates an example galvanic tool 200, or an array laterolog, according to aspects of the present disclosure. The galvanic tool 200 may comprise a central current electrode, or survey electrode, $A_0$, surrounded symmetrically by additional current electrode pairs $A_1$ and $A_1'$, $A_2$ and $A_2'$, and $A_3$ and $A_3'$, otherwise known as guard electrodes. The current electrode pairs may be used to focus the current from the central current electrode $A_0$ within the formation, to capture resistivity measurements at various horizontal depths within the formation. For example, monitor electrodes $M_1$ and $M_2$ may be positioned between survey electrode $A_0$ and current electrode $A_1$. Each of the monitor electrodes may form a monitor electrode pair with an electrode placed symmetrically on an opposite side of the survey electrode $A_0$. In FIG. 2, for example, the monitor electrode pairs include $M_1$ and $M_1'$, $M_2$ and $M_2'$, $M_3$ and $M_3'$, and $M_4$ and $M_4'$. Additionally, the monitor electrode pairs may be arranged along the galvanic tool 200 such that one half of a monitor electrode pair is adjacent to one half of another electrode pair, between the survey electrode and a guard electrode, or between two guard electrodes. As can be seen, for example, monitor electrode $M_1$ is adjacent to monitor electrode $M_2$ between survey electrode $A_0$ and current electrode $A_1$, and monitor electrode $M_1'$ is adjacent to monitor electrode $M_2'$ between survey electrode $A_0$ and current electrode $A_1'$.

The galvanic tool 200 may be used to measure signals and values that can then be used to compute the resistivity of the formation. For example, the galvanic tool 200 on a wireline 206 may be introduced into a borehole 204 within a formation 202, and a current may be transmitted into the formation 202 from the survey electrode $A_0$. Transmitting the current into the formation from the survey electrode $A_0$ may cause a first voltage to be generated, for example, on at least one of the monitor electrode pairs $M_1$ and $M_1'$, $M_2$ and $M_2'$, $M_3$ and $M_3'$, and $M_4$ and $M_4'$ surrounding the survey electrode $A_0$. In certain embodiments, the current electrode pairs $A_1$ and $A_1'$, $A_2$ and $A_2'$, and $A_3$ and $A_3'$ may also transmit a current into the formation to focus the current transmitted by the survey electrode into the formation. The voltage generated at the monitor electrode pairs $M_1$ and $M_1'$, $M_2$ and $M_2'$, $M_3$ and $M_3'$, and $M_4$ and $M_4'$ may also be generated in part, by the current from the current electrode pairs. Once the voltage is generated, the galvanic tool 200 may measure the generated voltage using a measurement point coupled to at least one of the monitor electrode pairs. For example, in existing galvanic tools, the measurement point may comprise a sensor coupled to the top electrode of each monitor electrode pair. Once the generated voltage is measured, the galvanic tool 200 may then determine the resistivity of the formation using the generated voltage measurement and the strength of the current transmitted by the survey electrode $A_0$.

Each of the monitor electrode pairs $M_1$ and $M_1'$, $M_2$ and $M_2'$, $M_3$ and $M_3'$, and $M_4$ and $M_4'$ and each of the current electrode pairs $A_1$ and $A_1'$, $A_2$ and $A_2'$, and $A_3$ and $A_3'$ may be coupled together by a conductive wire. In the case of the monitor electrode pairs $M_1$ and $M_1'$, $M_2$ and $M_2'$, $M_3$ and $M_3'$, and $M_4$ and $M_4'$, the conductive wires may function to hold the monitor electrode pairs at the same potential relative to the measurement point during measurement operations. Unaccounted for voltage variations between two electrodes in an electrode pair may decrease the accuracy of future resistivity calculations by adding uncertainty into the measurement of the generated voltage. Unfortunately, the conductive wire typically has a non-negligible resistance that can lead to voltage variation. For example, when the galvanic tool 200 moves across a formation boundary with a high resistivity contrast, a current may be generated within the conductive wire. Due to the non-negligible resistance, when a current passes through the conductive wire, it may drive up the potential at one of the electrodes relative to the measurement point. This can lead to a considerable voltage difference between the monitor electrodes pairs, which degrades the quality of the measurement taken at the measurement point. This effect may be known otherwise as the internal resistance effect.

Figure 3:
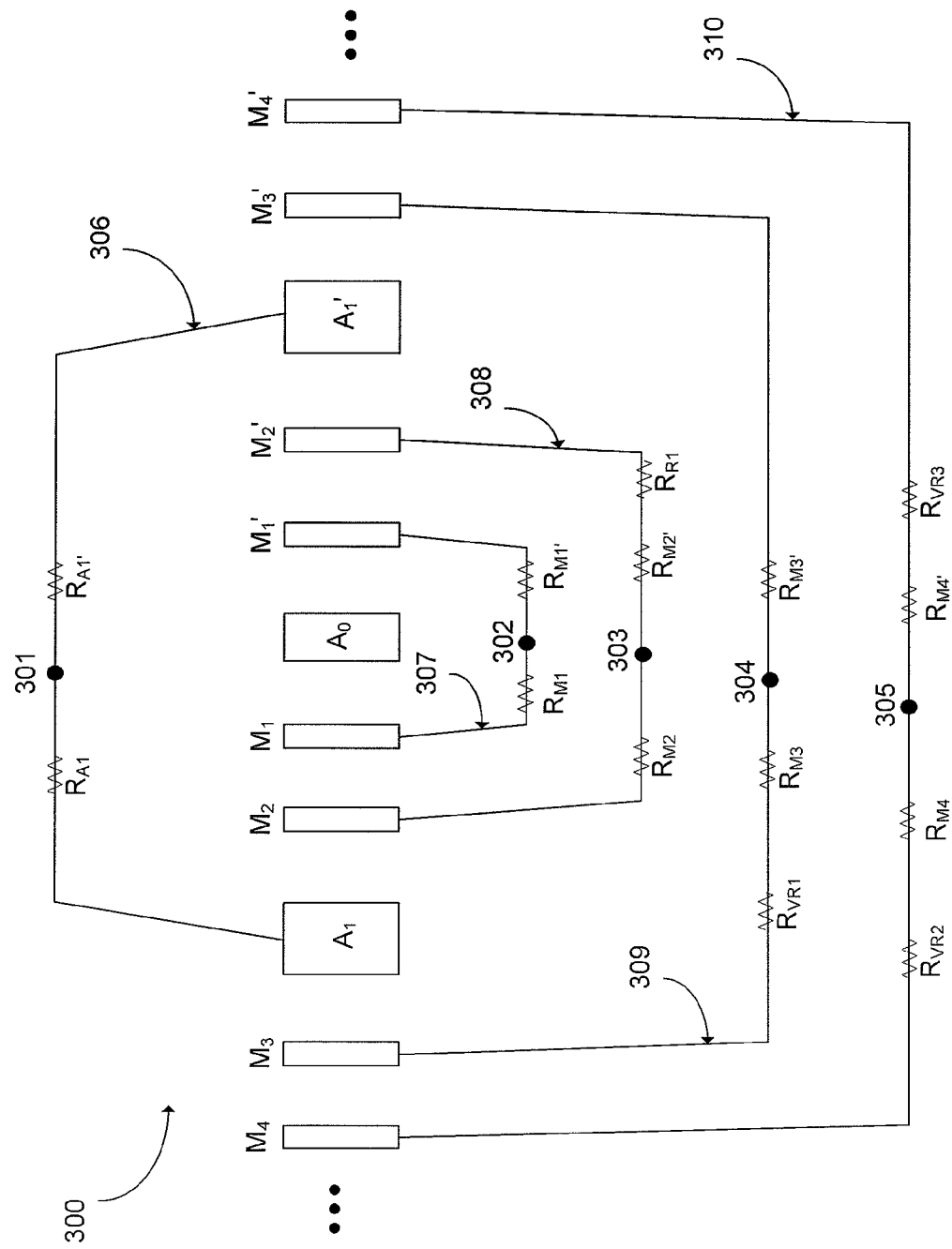
FIG. 3 illustrates a functional illustration of an example galvanic tool, according to aspects of the present disclosure.

FIG. 3 illustrates a functional diagram of an example galvanic tool 300 according to aspects of the present disclosure. As will be explained below, the galvanic tool 300 may adjust for the internal resistance effect by balancing the resistance of the conductive wire about the measurement point. As will be shown below, the galvanic tool 300 assumes that there will be a current generated between two electrodes in a monitor electrode pair and attempts to equalize any voltage gain or drop between the measurement point and the monitor electrode pair. As will be discussed below, the resistances can be balanced, for example, by selecting a position of the measurement point to account for resistance values, or adding in extra resistive elements to balance the resistance on either side of the measurement point.

As can be seen, the galvanic tool 300 includes a survey electrode $A_0$ along with a current electrodes pair $A_1$ and $A_1'$. Additionally, galvanic tool 300 includes monitor electrode pairs $M_1$ and $M_1'$, $M_2$ and $M_2'$, $M_3$ and $M_3'$, and $M_4$ and $M_4'$. Other configurations are possible, including galvanic tools with additional current electrode pairs and monitor electrode pairs. Monitor electrode pairs $M_1$ and $M_1'$, $M_2$ and $M_2'$, $M_3$ and $M_3'$, and $M_4$ and $M_4'$ may be connected by conductive wires 307, 308, 309, and 310, respectively. Likewise, current electrode pair $A_1$ and $A_1'$ may be connected by conductive wire 306. Measurement points 301-305 may be positioned along the conductive wires 306-310, respectively. As previously mentioned, the measurement point may comprise sensors coupled to the conductive wires. When a measurement point is positioned along one of the conductive wires, the resistance of the wire may be divided into two resistances, one from the measurement point to the upper electrode and one from the measurement point to the lower electrode of each electrode pair, respectively.

For example, measurement point 302 may be positioned on conductive wire 307 between monitor electrodes $M_1$ and $M_1'$. The conductive wire 307 may include a resistance $R_{m1}$ between the measurement point 302 and the monitor electrode $M_1$, and a resistance $R_{m1}'$ between the measurement point 302 and the monitor electrode $M_1'$. The conductive wire 308 may include a resistance $R_{m2}$ between the measurement point 303 and the monitor electrode $M_2$, and a resistance $R_{m2}'$ between the measurement point 303 and the monitor electrode $M_2'$. The conductive wire 309 may include a resistance $R_{m3}$ between the measurement point 304 and the monitor electrode $M_3$, and a resistance between the measurement point 304 and the monitor electrode $M_3'$. The conductive wire 310 may include a resistance $R_{m4}$ between the measurement point 305 and the monitor electrode $M_4$, and a resistance $R_{m4}'$ between the measurement point 305 and the monitor electrode $M_4'$. Likewise, the conductive wire 306 may include a resistance $R_{a1}$ between the measurement point 301 and the current electrode $A_1$, and a resistance $R_{a1}'$ between the measurement point 301 and the monitor electrode $A_1'$.

In certain embodiments, the resistances between the measurement points and the monitor electrodes may be balanced. Balanced resistances may include resistances that are substantially the same within the mechanical and electrical tolerances of the conductive wire and other elements, as would be appreciated by one of ordinary skill in the art in view of this disclosure. In one embodiment, the measurement point may be located along the length of the conductive wire such that the internal resistance of the conductive wire is equally split on either side of the measurement point. For example, the measurement point may be located such that $R_{m1}=R_{m2}=R_{m2}'$, etc. This does not necessarily mean that the measurement points are located at the center of the conductive wires, and the internal resistance of the conductive wire may be non-constant. In other embodiments, the measurement point may be located at any location along the conductive wire, and resistive elements may be coupled to the conductive wire, such that the resistances between the measurement points and the monitor electrodes are the same. One example resistive element $R_{R1}$ is shown in FIG. 3 coupled to wire 308. The resistive element $R_{R1}$ may have a resistive value, for example, such that $R_{m2}=R_{m2}'+R_{R1}$. Similar arrangements may be used with the other conductive wires. The resistive elements may include resistors well known in the art, which may be positioned on one or both sides of the measurement point. For example, if a galvanic tool were designed such that the measurement points were located at the center of each conductive wire, a resistor may be coupled to one side of the measurement point such that the resistance in the first half of the conductive wire equals the resistance in the second half of the resistive wire. The resistor values need not be the same; rather, the value may differ depending on the location of the measurement point and the resistance of the conductive wire.

When a galvanic tool is deployed downhole, downhole conditions, such as temperature, may cause the resistances of the conductive wires and other resistive elements to change. To maintain the resistive balance along the conductive wires, variable resistors may be coupled to the conductive wire. One example variable resistor $R_{VR1}$ is shown in FIG. 3 coupled to wire 309. The resistive element $R_{VR1}$ may have a resistive value, for example, such that $R_{m3}+R_{VR1}=R_{m3}'$. Similar arrangements may be used with the other conductive wires. Unlike resistors with fixed values, the variable resistors may be operable to automatically adjust their resistance based on downhole conditions to balance the resistances between the measurement points and the monitor electrode. In certain embodiments, a resistive element, such as a variable resistor may be coupled to one or both sides of the measurement point, to maintain balance on both sides of the measurement point. One example variable resistor pair $R_{VR2}$ and $R_{VR3}$ is shown in FIG. 3 coupled to wire 310. The resistive element $R_{VR2}$ and $R_{VR3}$ may have a resistive value, for example, such that $R_{m4}+R_{VR2}=R_{m4}'+R_{VR3}$. Similar arrangements may be used with the other conductive wires. The variable resistors may be controlled by a processor deployed within the galvanic tool or at the surface, and may respond to sensor measurements regarding downhole conditions, such as temperature, pressure, etc.

In certain embodiments, each conductive wire, alone or with coupled resistive elements, may comprise a total resistance. The total resistance may comprise the cumulative resistance along the conductive wire between the monitor electrodes. For example, the total resistance of conductive wire 307 may comprise $R_{m1}+R_{m1}'$. In certain embodiments, the monitor electrode pairs symmetrically positioned between current electrode pairs, such as M1/M1' and M2/M2', may have balanced total resistances. For example, assuming for illustrative purposes that the resistive elements are not included, in certain embodiments $R_{m1}+R_{m1}'=R_{m2}+R_{m2}'$; $R_{m3}+R_{m3}'=R_{m4}+R_{m4}'$. Likewise, for example, $R_{m4}+R_{VR2}+R_{m4}'+R_{VR3}$ may be balanced with $R_{m3}+R_{VR1}+R_{m3}'$. Although the above equations show the total resistance as equal, exact equality is not required, as variations in the mechanical and electrical properties of the components may affect the balance. Also, like the process for balancing the resistances on a single conductive wire, resistive elements, both set and variable, can be selected to balance the total resistances between adjacent conductive wires.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A galvanic tool for measuring formation resistivity, comprising:
   a survey electrode, wherein the survey electrode transmits a first current into a formation;
   a first current electrode;
   a second current electrode, wherein the first current electrode and the second current electrode transmit a second current into the formation to focus the first current transmitted by the survey electrode into the formation;
   a first monitor electrode;
   a second monitor electrode, wherein the first monitor electrode and the second monitor electrode are positioned between the first current electrode and the second current electrode, and wherein the first current and the second current cause a first voltage to be generated at the first monitor electrode and the second monitor electrode;
   a first conductive wire coupling the first monitor electrode to the second monitor electrode;
   a second conductive wire coupling the first current electrode to the second current electrode;
   a first measurement point located on the first conductive wire, wherein the first measurement point is in series between the first monitor electrode and the second monitor electrode; and
   a first resistive element coupled to the first conductive wire, wherein the first resistive element is in series between the first monitor electrode and the second monitor electrode;
   a third resistive element coupled to the second conductive wire, wherein the third resistive element is in series between the first current electrode and the second current electrode;
   a third monitor electrode adjacent to the first monitor electrode;
   a fourth monitor electrode adjacent to the second monitor electrode;
   a third conductive wire coupling the third monitor electrode to the fourth monitor electrode;
   a second measurement point located on the third conductive wire;
   a second resistive element coupled to the third conductive wire;
   a first total resistance comprises the cumulative resistance between the first monitor electrode and the second monitor electrode;
   a second total resistance comprises the cumulative resistance between the third monitor electrode and the fourth monitor electrode; and
   the first total resistance equals the second total resistance.

2. The galvanic tool of claim 1, wherein the first resistive element comprises a variable resistor.

3. The galvanic tool of claim 2, wherein the variable resistor balances the resistance between the first measurement point and the first monitor electrode with the resistance between the first measurement point and the second monitor electrode.

4. The galvanic tool of claim 2, further comprising a fourth resistive element coupled to the first conductive wire, wherein the first resistive element is disposed between the first measurement point and the first monitor electrode and the fourth resistive element is disposed between the first measurement point and the second monitor electrode.

5. The galvanic tool of claim 4, wherein the first resistive element and the fourth resistive element balance the resistance between the first measurement point and the first monitor electrode and the resistance between the first measurement point and the second monitor electrode.

6. The galvanic tool of claim 1, wherein the second resistive element balances the resistance between the second measurement point and the third monitor electrode with the resistance between the second measurement point and the fourth monitor electrode.

7. The galvanic tool of claim 1, wherein first total resistance and the second total resistance vary with operational parameters.

8. A method for improving the accuracy of galvanic measurements, comprising:
    introducing a galvanic tool into a formation;
    transmitting a first current into the formation from a survey electrode coupled to the galvanic tool;
    transmitting a second current into the formation by a first current electrode and a second current electrode to focus the first current, wherein the first current and the second current cause a first voltage to be generated at a first monitor electrode and a second monitor electrode coupled to the galvanic tool, wherein the first monitor electrode and the second monitor electrode are coupled by a first conductive wire and are positioned between the first current electrode and the second current electrode, wherein the first current electrode and the second current electrode are coupled by a second conductive wire, wherein a first resistive element is coupled to the second conductive wire and is in series between the first current electrode and the second current electrode; and
    measuring the voltage at a first measurement point disposed on the first conductive wire, wherein the first measurement point is in series between the first monitor electrode and the second monitor electrode, and wherein a first resistance between the measurement point and the first monitor electrode is the same as a second resistance between the measurement point and the second monitor electrode;
    receiving a second voltage at a third monitor electrode and a fourth monitor electrode coupled to the galvanic tool, wherein the third monitor electrode and the fourth monitor electrode are coupled by a third conductive wire;
    measuring the second voltage at a second measurement point disposed on the third conductive wire, wherein a third resistance between the second measurement point and the third monitor electrode is the same as a fourth resistance between the second measurement point and the fourth monitor electrode; and
    wherein a first total resistance comprises the first resistance and the second resistance, wherein a second total resistance comprises the third resistance and the fourth resistance, and wherein the first total resistance is the same as the second total resistance.

9. The method of claim 8, further comprising balancing at least one of the first resistance and the second resistance using a resistive element coupled to the first conductive wire.

10. The method of claim 9, wherein the resistive element comprises a variable resistor.

11. The method of claim 10, wherein the variable resistor automatically balances at least one of the first resistance and the second resistance based, at least in part, on the downhole conditions.

12. The method of claim 9, wherein the first total resistance and the second total resistance vary with operational parameters.

13. A galvanic tool for measuring formation resistivity, comprising:
    a survey electrode, wherein the survey electrode transmits a first current into a formation;
    a first current electrode;
    a second current electrode, wherein the first current electrode and the second current electrode transmit a second current into the formation to focus the first current transmitted by the survey electrode into the formation;
    a first monitor electrode positioned above the survey electrode;
    a second monitor electrode positioned below the survey electrode, wherein the first monitor electrode and the second monitor electrode are positioned between the first current electrode and the second current electrode, and wherein the first current and the second current cause a first voltage to be generated at the first monitor electrode and the second monitor electrode;
    a third monitor electrode adjacent to the first monitor electrode;
    a fourth monitor electrode adjacent to the second monitor electrode;
    a first conductive wire coupling the first monitor electrode to the second monitor electrode;
    a second conductive wire coupling the third monitor electrode to the fourth monitor electrode;
    a third conductive wire coupling the first current electrode to the second current electrode;
    a first measurement point located on the first conductive wire, wherein the first measurement point is in series between the first monitor electrode and the second monitor electrode;
    a first resistive element coupled to the first conductive wire, wherein the first resistive element is in series between the first monitor electrode and the second monitor electrode;
    a second measurement point located on the second conductive wire, wherein the second measurement point is in series between the third monitor electrode and the fourth monitor electrode;
    a second resistive element coupled to the second conductive wire, wherein the second resistive element is in series between the third monitor electrode and the fourth monitor electrode;
    a third resistive element coupled to the third conductive wire, wherein the third resistive element is in series between the first current electrode and the second current electrode;
    a first total resistance comprises the cumulative resistance between the first monitor electrode and the second monitor electrode;

a second total resistance comprises the cumulative resistance between the third monitor electrode and the fourth monitor electrode; and the first resistive element and the second resistive element balance the first total resistance with the second total resistance.

14. The galvanic tool of claim 13, wherein:

the first resistive element balances the resistance between the first measurement point and the first monitor electrode with the resistance between the first measurement point and the second electrode, and the second resistive element balances the resistance between the second measurement point and the third monitor electrode with the resistance between the second measurement point and the fourth monitor electrode.

\* \* \* \* \*